United States Patent
Kuijper et al.

(10) Patent No.: US 8,326,119 B2
(45) Date of Patent: Dec. 4, 2012

(54) OPTICAL RECORD CARRIER, AS WELL AS A METHOD AND AN APPARATUS FOR RECORDING A DISC SHAPED OPTICAL RECORD CARRIER

(75) Inventors: Maarten Kuijper, Helmond (NL); Petrus Henricus Cornelius Bentvelsen, Waalre (NL); Mathias Martinus Maria Timmermans, Weert (NL); Markus Wilhelmus Maria Coopmans, Helden (NL)

(73) Assignee: Lite-On It Corporation, Taipei (TW)

( * ) Notice: Subject to any disclaimer, the term of this patent is extended or adjusted under 35 U.S.C. 154(b) by 756 days.

(21) Appl. No.: 12/187,996

(22) Filed: Aug. 7, 2008

(65) Prior Publication Data
US 2009/0103424 A1 Apr. 23, 2009

Related U.S. Application Data

(60) Provisional application No. 60/954,494, filed on Aug. 7, 2007.

(51) Int. Cl.
*H04N 9/80* (2006.01)

(52) U.S. Cl. ........ 386/248; 386/240; 386/241; 386/244; 369/47.1; 369/272.1; 369/275.3; 369/286; 369/288

(58) Field of Classification Search .............. 386/95, 386/240, 241, 248; 369/47, 272, 275, 286, 369/288
See application file for complete search history.

(56) References Cited

U.S. PATENT DOCUMENTS

| | | | |
|---|---|---|---|
| 2001/0008578 A1* | 7/2001 | Otomo et al. | 386/98 |
| 2001/0009606 A1* | 7/2001 | Otomo et al. | 386/96 |
| 2005/0007893 A1* | 1/2005 | Uchida et al. | 369/13.24 |
| 2005/0111317 A1* | 5/2005 | Muramatsu et al. | 369/47.27 |
| 2005/0265156 A1* | 12/2005 | Nakane et al. | 369/47.1 |
| 2006/0077881 A1* | 4/2006 | Igi et al. | 369/275.1 |
| 2006/0159431 A1* | 7/2006 | Ando et al. | 386/95 |
| 2006/0204894 A1* | 9/2006 | Kobayashi et al. | 430/270.11 |
| 2007/0002721 A1* | 1/2007 | Yoshimura et al. | 369/286 |
| 2007/0031122 A1* | 2/2007 | Yamagata et al. | 386/95 |
| 2007/0097849 A1* | 5/2007 | Sakamoto et al. | 369/288 |
| 2007/0206463 A1* | 9/2007 | Kuroda | 369/47.1 |
| 2007/0279479 A1* | 12/2007 | Hirotsune et al. | 347/224 |
| 2007/0281123 A1* | 12/2007 | Umezawa et al. | 428/64.4 |
| 2008/0222737 A1* | 9/2008 | Basile et al. | 726/27 |
| 2009/0016203 A1* | 1/2009 | Yahata et al. | 369/272.1 |

* cited by examiner

*Primary Examiner* — Thai Tran
*Assistant Examiner* — Gary Gracia
(74) *Attorney, Agent, or Firm* — WPAT PC; Justin King

(57) ABSTRACT

An apparatus is described for recording an optical record carrier (40). The apparatus is arranged for recording a visually detectable pattern (LBL) at the record carrier in a ring shaped zone (RP). The apparatus is further arranged to record data (Data1, Data2) and a primary data organizing system (FS) wherein the data is organized. The primary data organizing system (FS) does not refer to a physical address within the ring shaped zone. The apparatus is further arranged for recording at least part of the data (Data2) or the primary data organizing system on the record carrier at an area peripherally arranged with respect to the ring shaped zone.

11 Claims, 12 Drawing Sheets

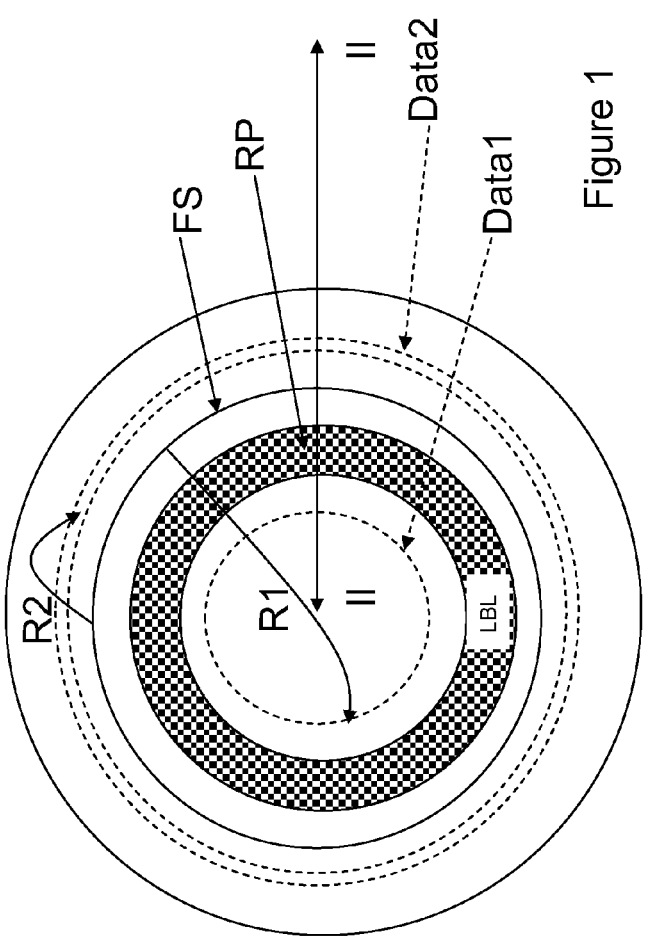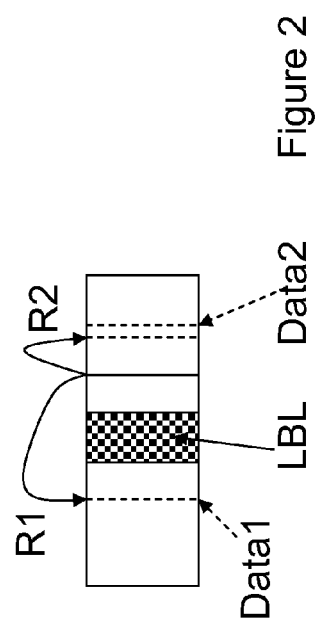

OPTICAL RECORD CARRIER, AS WELL AS A METHOD AND AN APPARATUS FOR RECORDING A DISC SHAPED OPTICAL RECORD CARRIER

CROSS-REFERENCE TO RELATED APPLICATIONS

This application claims the priority benefit of Maarten et al, U.S. Provisional Patent Application Ser. No. 60/954,494, filed on Aug. 7, 2007, the contents of which are expressly incorporated herein by reference in their entirety, including any references contained therein.

This application relates to Timmermans U.S. patent application Ser. No. 12/188,015 filed on Aug. 7, 2008, which is the non-provisional of U.S. Provisional Patent Application No. 60/954,520 filed on Aug. 7, 2007, both of which are entitled "Optical Record Carrier With A Visually Detectable Pattern As Well As An Apparatus And A Method For Recording A Visually Detectable Pattern On An Optical Record Carrier."

This application relates to Coopmans U.S. patent application Ser. No. 12/188,030 filed on Aug. 7, 2008, which is the non-provisional of U.S. Provisional Patent Application No. 60/954,490 filed on Aug. 7, 2007, both of which are entitled "Method For Recording A Visible Pattern On An Optical Record Carrier, Apparatus For Recording A Visually Detectable Pattern On A Record Carrier And Instruction To Be Executed By The Apparatus."

The disclosures of the above identified related provisional and non-provisional applications are expressly incorporated herein by reference in their entirety, including the disclosure of any references contained therein.

TECHNICAL FIELD

The invention relates to a record carrier with a visually detectable pattern as well as a method, and an apparatus to print a visually detectable pattern on an optical record carrier.

BACKGROUND

US 2004/0062179 describes an optical disc recording apparatus capable of forming a visually detectable pattern on an optical disc. The visually detectable pattern comprises for example a logo, a sequence of characters or a combination thereof. The visually detectable pattern is printed at a resolution suitable for detection by the human visual system. For example the visually detectable pattern may be printed at a resolution of 1 to several hundred dots per $mm^2$ (as compared to computer readable data, which is stored at the record carrier at a resolution in the order of several Mbits/$mm^2$) In this way a user does not need a reading device to recognize the contents of the optical disk. A simple visual inspection suffices.

In general, data recordings on optical discs start at a certain radius at the central part of the disc and follow a groove that spirals outwards. With optical disc types such as CD and DVD, the specifications require in most cases that the data is contiguously recorded between a start and an end of the data recording (this is to ensure playability in Read-Only devices). Existing recording apparatuses that are able to print a visually detectable pattern to the disc, will therefore print this pattern at a radius outside the recorded data. The disadvantages of that location are:

(1) A visually detectable pattern with a certain radial width occupies more storage space at the peripheral portion of a disc than at a more central portion of the disc;

(2) It is not possible to append data without destroying the original visually detectable pattern; and (3) The visually detectable pattern is a feature that is not standardized in common optical disc system standards. The area comprising the visually detectable pattern contains data that is not interpretable by devices according to the optical disc system standards. Very likely, no tracking signals, such as DPD or push pull signals, for servo control are generated when the read head accesses this area. The absence of tracking signals might cause unwanted compatibility problems with legacy drives. To maintain the exchange-compatibility of a recorded disc containing the visually detectable pattern with other drives that only expect machine-readable data (non-aware drives) it is desired that The effects of the visually detectable pattern do not impede normal players and drives for the record carrier;

Read access of the area with the visually detectable pattern is minimized; and

An area containing a visually detectable pattern is not unintentionally overwritten with new data.

The apparatus described in US 2004/0062179 arranges the visually detectable pattern at the periphery of the disc. This position of the visually detectable pattern however has the disadvantage that it occupies a relatively large area. As a result the data storage capacity of the disc is substantially reduced.

SUMMARY OF THE INVENTION

It is a purpose to provide for a method of recording a visually detectable pattern at an optical record carrier that at least partially overcomes the above-described disadvantages.

According to an aspect of the invention an optical record carrier is provided comprising, a visually detectable pattern at a recording layer of the record carrier, the recording layer having a data area for storing data, and at least a primary data organizing system wherein the data is organized, wherein the data and the at least primary data organizing system are usually stored in the form of marks and are preferably encoded by means of a channel code, and the primary data organizing system does not refer to a physical address within a ring shaped portion of the record carrier containing the visually detectable pattern, wherein at least a part of the primary data organizing system, and/or the data is peripherally arranged with respect to the visually detectable pattern.

Peripherally arranged is understood to be arranged at a location with a larger radius in relation to a centre of rotation of the record carrier. The optical record carrier may be a disc shaped optical record carrier, but may otherwise be another type of optical record carrier that is recorded or played as a disc shaped optical record carrier. On such record carriers data is recorded along tracks that are arranged spirally or in concentric circles around the centre of rotation. An example of such an alternative optical record carrier is a CD-credit card.

A system for organizing the data can be realized in various ways. The data may for example be arranged in a table of contents (TOC) having a list of pointers pointing to the files organized therein, also denoted as record management data (RMD) in some applications. Another embodiment of such an organizing system is a file system, e.g. UDF, ISO9660, BDFS etc. Alternatively or additionally the data may be organized at an application level, e.g. a video manager. In such a data organizing system the data or files of data may for example be organized in a menu structure or as a linked list. The data organizing system need not necessarily use reference or pointers to make particular items of data available. Alternatively, associative means may be used, like labels preceding the data items. Alternatively the data organizing system may make use of a particular ordering of the data. For example all data items therein have the same size and are arranged in a predetermined sequence, so that data item n of size S is found at location offset+n·S, wherein only the offset is provided in an address table.

According to a further aspect of the invention a method for recording a disc shaped record carrier is provided, comprising the steps of printing a visually detectable pattern, the visually detectable pattern being arranged in a ring shaped zone of a recording layer of the optical record carrier, recording in the recording layer data and at least a primary data organizing system for organizing the data, wherein part of the primary data organizing system or part of the data is recorded at an area peripherally arranged with respect to the ring shaped zone.

According to a still further aspect of the invention an apparatus for recording an optical record carrier is provided, the apparatus having a recording facility for recording in the recording layer a data and a primary data organizing system wherein the data is organized.

The recording facility of the apparatus is further arranged for printing a visually detectable pattern in a ring shaped zone of a recording layer of the record carrier, wherein the primary data organizing system does not refer to a physical address within the ring shaped zone. The recording facility is further capable of recording at least part of the data or the primary data organizing system on the record carrier at an area peripherally arranged with respect to the ring shaped zone.

In a disc shaped optical record carrier according to the invention storage space is saved if the visually detectable pattern is applied more centrally while maintaining the same ring width, i.e. the distance between the outer and the inner diameter of the ring. When the ring is kept free of data addressed by the primary data organizing system, the drive will not send the read head in the unreadable zone to attempt to read data.

It is noted that JP2005135464 describes a record carrier wherein a visually detectable pattern is arranged. To prevent an apparatus from attempting to interpret the visually detectable pattern as data, the area with the visually detectable pattern is marked as a defective sector. As defects cannot always be indicated as ranges it requires that each individual address occupied by the visually detectable pattern must be added in the defect list. This requires a significant amount of data. In practice the defect table may even be too small to mark the area required for a label of sufficient size, e.g. a radial dimension of 4 mm.

In the present invention the primary data organizing system does not refer to a physical address within a ring shaped portion of the record carrier containing the visually detectable pattern. In this way an apparatus' attempts to interpret the visually detectable pattern as machine readable data are prevented. Accordingly in the method according to the present invention it is not necessary to provide defect management, which simplifies the control structure.

It is not necessary that the ring shaped zone be entirely occupied. It is only essential that the primary data organizing system in which the data is organized on the disc does not refer to the physical address within the ring shaped zone.

The optical record carrier may for example be an optical disc, e.g. one of the types CD-R, CD-RW, DVD+/−R, DVD+/−RW, BD-R, BD-RE, or HD-DVD. [DVD-RAM] Alternatively the optical record carrier may be another medium that can be read out with optical means, e.g. a credit card CD, provided that the data is arranged on such an optical record carrier as in an optical disc, i.e. spirally or concentrically arranged around a centre of rotation.

Various recording modes are possible at basic format level, e.g. disc at once, multi-session, sequential with or without logical overwrite and random.

The visually detectable pattern is preferably arranged in a visual image window that comprises a buffer zone on both sides of the visually detectable pattern. This has the advantage that when the read head of an optical record carrier moves outside the intended data area into the visual image window, the read head will most likely enter one of the buffer zones, which enable the optical record player to generate a tracking signal with which the position of the read head can be corrected. The embodiment wherein the visually detectable pattern is arranged between a first and a second session has the advantage that the closure of the preceding session and the introduction of the succeeding session function have a buffer zone. This is also advantageous for replay of the record carrier at a pre-fetching drive, i.e. a drive that already reads ahead the data that it expects that the host will ask.

BRIEF DESCRIPTION OF THE DRAWINGS

These aspects are described in more detail with reference to the drawings wherein FIG. 1 schematically shows an embodiment of an optical record carrier according to the invention, FIG. 2 schematically shows the data content of the record carrier of FIG. 1 in a radial direction of the record carrier, FIG. 3 schematically shows the data content of a second embodiment of a record carrier according to the invention, FIG. 4 schematically shows the data content of a third embodiment of a record carrier according to the invention, FIG. 5 schematically shows the data content of a fourth embodiment of a record carrier according to the invention, FIG. 6 schematically shows the data content of a fifth embodiment of a record carrier according to the invention, FIG. 7 schematically shows the data content of a sixth embodiment of a record carrier according to the invention, FIG. 8 schematically shows the data content of a seventh embodiment of a record carrier according to the invention, FIG. 9 schematically shows the data content of an eighth embodiment of a record carrier according to the invention, FIG. 10 schematically shows the data content of a ninth embodiment of a record carrier according to the invention.

DETAILED DESCRIPTION OF THE DRAWINGS

FIG. 1 schematically shows an embodiment of a disc shaped optical record carrier according to the invention comprising,
a visually detectable pattern LBL, and
Data 1, Data 2 forming data recorded on the disc, and
a primary data organizing system, here a file system FS, wherein the data is organized.

The file system refers with pointers R1 and R2 to a first portion of the data Data 1 and a second portion of the data Data 2 respectively. The file system does not refer to a physical address within a ring shaped portion RP of the record carrier containing the visually detectable pattern LBL. At least a part of the file system or the data is peripherally arranged with respect to the visually detectable pattern. Here the file system FS and the second portion of the data Data 2 are peripherally arranged with respect to the ring shaped portion RP. In the embodiment shown the data and the file system are recorded as marks in or at a recording layer of the record carrier, and encoded by means of a channel code. The visually detectable pattern is also printed at or in the recording layer.

FIG. 2 shows a representation of the content of the record carrier according to cross-section II-II in FIG. 1. Further embodiments of a record carrier according to the present invention will be displayed according to this representation.

Figure 3:
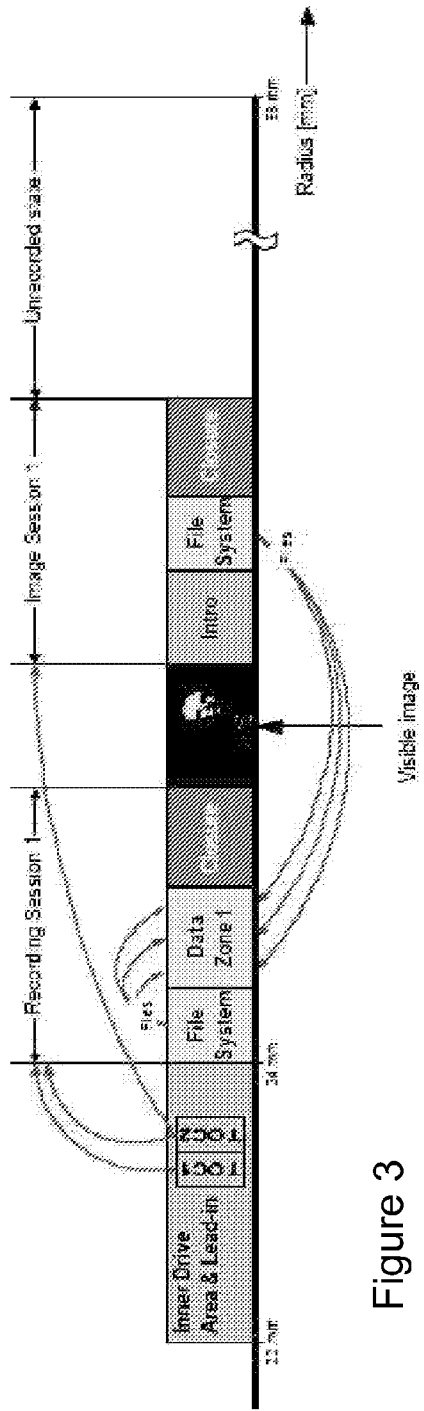

In the sequel various embodiments are described of an optical record carrier according to the invention that is backwards compatible. FIG. 3 shows the content of a record carrier that comprises a plurality of sessions (recording session 1, recording session 2). Each session comprises at least an introductory portion, a primary data organizing system and a closure portion. The visually detectable pattern is applied at an area between the closure portion of the first session and the introductory portion of a second session. In the embodiment shown the record carrier is a DVD+R. The most central portion of the disk comprises an inner drive area and lead in. This portion also comprises one or more TOCs (table of contents) or a comparable table, e.g. RMD (recording management data) in the DVD-R.

In the TOC or RMD, the following relevant session information is stored:
Session Status indicating whether adding a new session is allowed or not allowed,
Session number,
Session start address, start PSN (Physical sector number) of the data zone in the session,
Session end address, end PSN of the data zone in the session, and
Last fragment number in the session.

In the TOC or RMD, no reference is made to the label area (ring shaped zone). Instead it points as usual to the next first used regular data address. The next used regular data address is beyond the label area.

The record carrier comprises a first and a second recording session, and each comprises a primary data organizing system. The record carrier has an inner drive area followed by a lead-in (introduction) of the first recording session. The primary data organizing system in the first session refers to files stored in the data zone in that session. A second session is applied, here without user data. A primary data organizing system is written in the second session that is merely a copy of the primary data organizing system in the first session. A new TOC or RMD is added that refers to the session locations on the disc. A visually detectable pattern is applied at an area between the closure portion of the first session and the introductory portion of the second session.

In the case of a DVD+R, in the Table of Contents area, a new Table of Contents (TOC) is added when each session has been recorded. The new TOC refers to the Lead-in of the first session on the disc and all other Intro's of all other sessions. But the new TOC does not refer to the label area.

In the case of a DVD-R, in the Recording Management Area (RMA), a new Recording Management Data (RMD) is added when each session has been recorded. The new RMD refers to the Lead-in of the first session on the disc and all other Border-in's of all other sessions. In the RMD no reference is made to the label area.

The presented solution is especially useful for applying a label on DVD+R and DVD-R formats.
The solution prevents a normal application and a normal drive from accessing the label area.
The solution allows access and appending of the area beyond the label area by any normal drive.
The Logical Block Address space, LBA-space, remains contiguous with this solution.
Also a bit-copy of the user data is possible.

Figure 4:
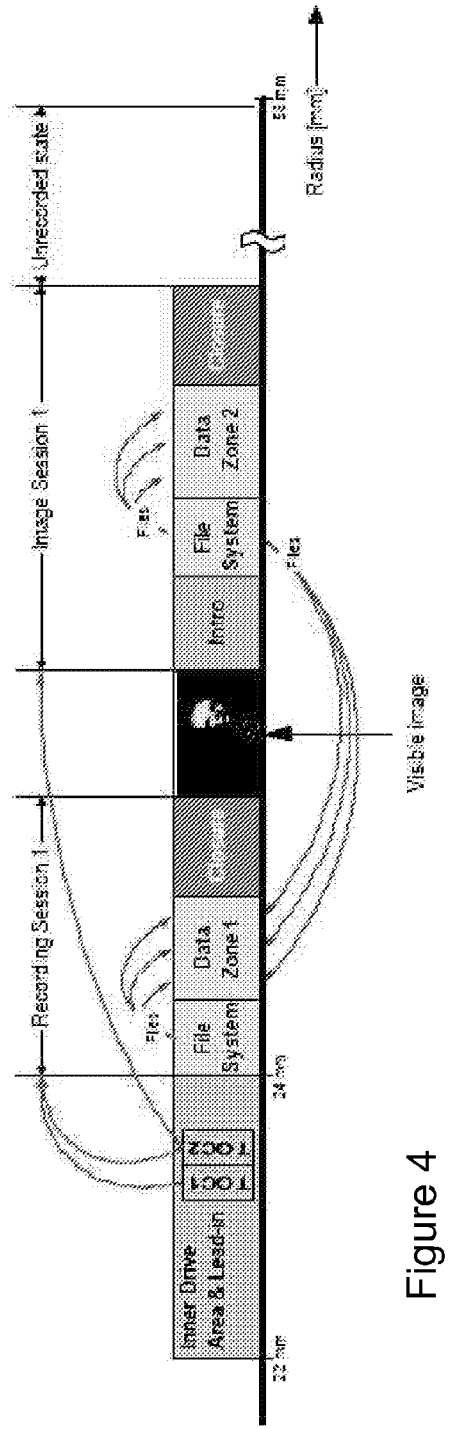

FIG. 4 shows a second embodiment. This second embodiment differs from the first embodiment in that the second session comprises user data. The primary data organizing system is copied from the first session to the second session. In addition new file system data is added in the second primary data organizing system data referencing to files in the second session.

Figure 5:
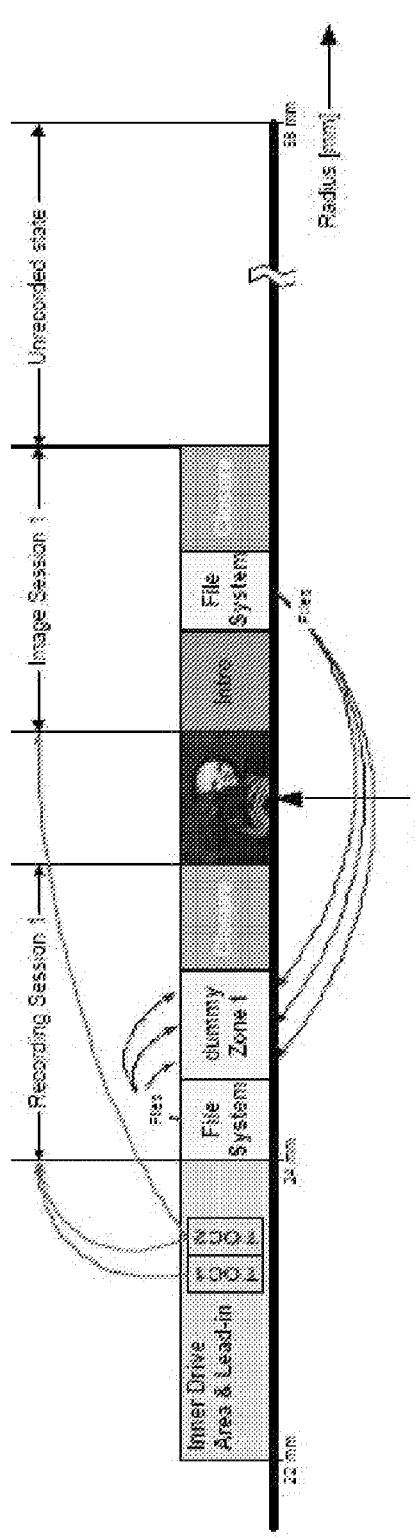

The embodiment shown in FIG. 5 differs from the embodiments of FIGS. 3 and 4 in that the visually detectable pattern (label) is recorded on a substantially empty disc. The visually detectable pattern will appear near the beginning of the disc and its circumference will be rather small. In the embodiment shown, a dummy session with dummy EFM data is added such that the actual visually detectable pattern is still located beyond a predetermined radius, e.g. 27 mm. In this way it is achieved that the visually detectable pattern is located sufficiently far beyond the start up area. The visually detectable pattern is encapsulated by a second empty session. Real user data can later on be recorded beyond the image session, or already included in the second session.

Figure 6:
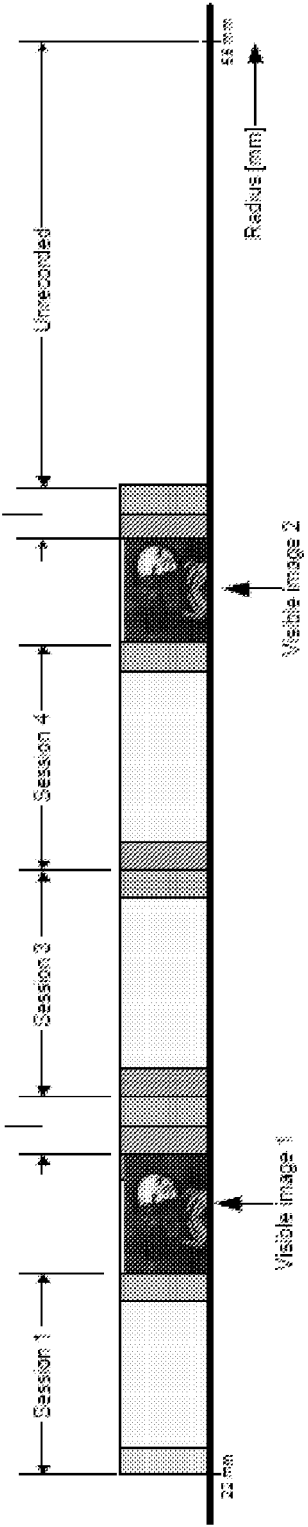

FIG. 6 shows an embodiment with a plurality of visually detectable patterns. Each visually detectable pattern is enclosed by a pair of sessions. Each of the sessions comprises an introductory portion, a primary data organizing system and a closure portion (not shown in detail).

Figure 7:
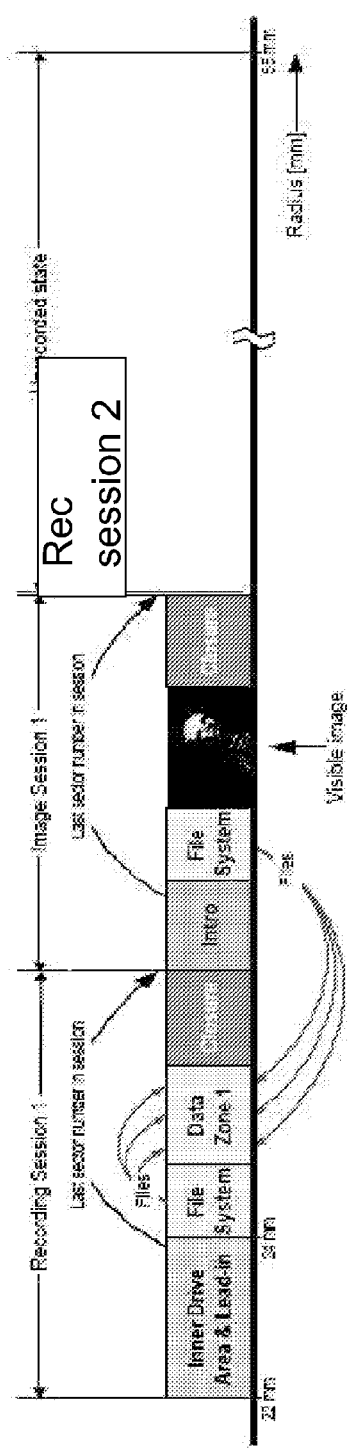

A further embodiment of a record carrier is shown in FIG. 7. In that embodiment the record carrier comprises at least one session (image session 1) with an introductory portion, denoted as Intro (for DVD+R) or Border In Zone (for DVD-R) for example, a primary data organizing system, a visually detectable pattern and a closure portion, denoted as Closure (for DVD+R) or a Border Out Area for DVD-R.). The visually detectable pattern is applied between the primary data organizing system and the closure portion of said at least one session. At least a second session (recording session 2) comprising data is peripherally arranged with respect to the at least one session.

In this embodiment the visually detectable pattern is part of a separate session, also denoted as an image session. This new session does not add files of itself, so no user data is recorded in this session. Accordingly the primary data organizing system will never send the read write/head in this area. At the outer side of the image session, a regular Lead-out (for DVD-R) or Closure (for DVD+R) is recorded. FIG. 7 depicts this. Although the image session has no real file-size of its own, the Last sector number in session points to a location at the end of the area acting comprising the visually detectable pattern, as if a substantial number of sectors are used in the image session.

FIG. 7 shows an already recorded session beyond which an image session is recorded. The primary data organizing system in the image session is a replica of the one in the previous session and is the only structure within the image session that will be accessed.

Figure 8:
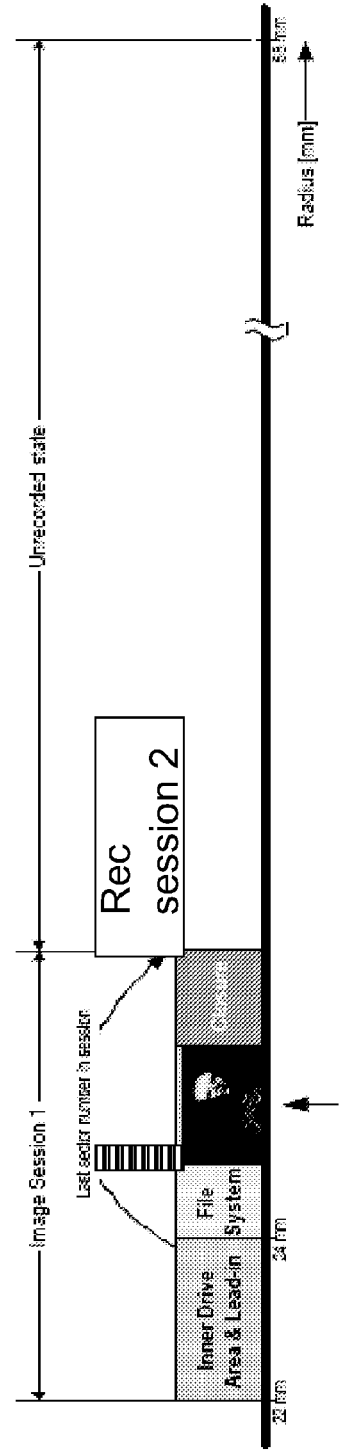

Alternatively a visually detectable pattern is recorded on an empty disc as shown in FIG. 8, so that it appears near the inner circumference. In order to achieve locating the visually detectable pattern sufficiently beyond the start up area, it is preferred to add a buffer zone comprising dummy EFM data within the image session preceding the visually detectable pattern. The buffer zone for example extends to a radius of 27 mm.

Figure 9:
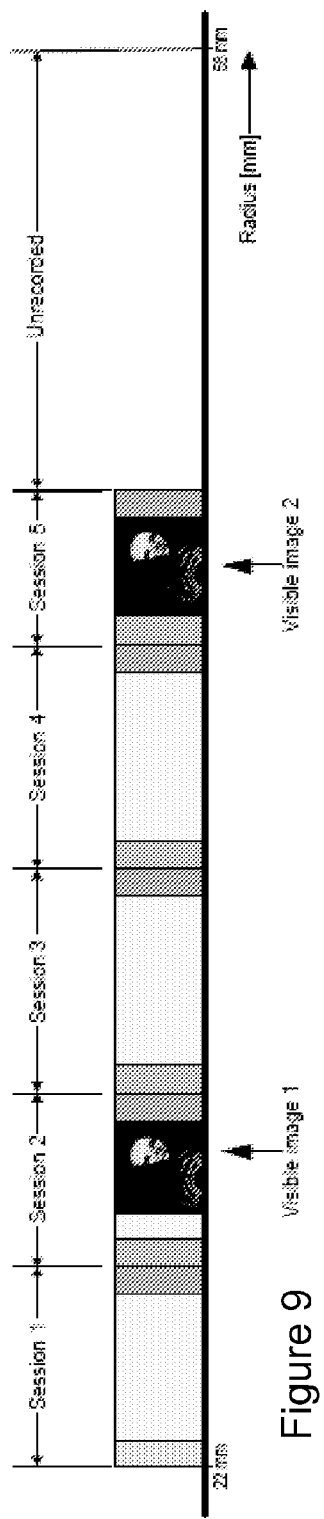

As shown in FIG. 9 more than a visually detectable pattern may be recorded in more than one session. Accordingly each of those sessions is characterized in that it has a visually detectable pattern and in that the primary data organizing system of that session does not address the area occupied by the visually detectable pattern.

The embodiments of FIGS. 3, 4, 5 and 6 have the characteristic that the logical data space is continuous. This facilitates copying of the record carrier onto another record carrier by methods ignorant of the presence of the visually detectable pattern on the disc. The embodiments of FIGS. 7 and 8 have the characteristic that the logical data space is not continuous. This feature is useful as a copy protection method.

On the other hand the embodiments of FIGS. 7 and 8 have the characteristic that the basic format is continuous in a sense that the adjacent lead-out and lead-in are attached to each other.

Figure 10:
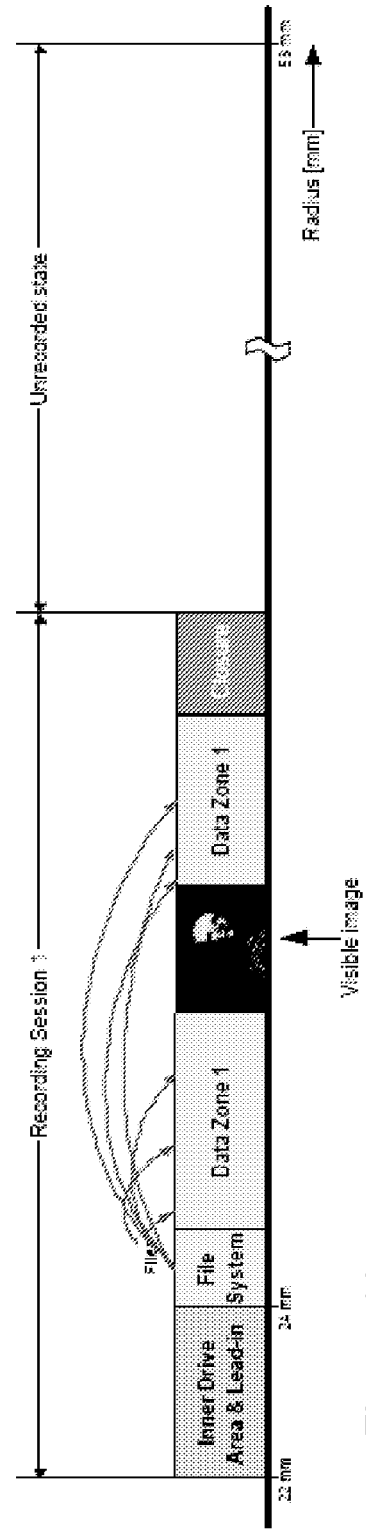

A still further embodiment is shown in FIG. 10. The record carrier shown therein comprises at least one session (Recording session 1) with an introductory portion (Inner drive area and lead-in), the primary data organizing system (File System), the visually detectable pattern (visual image) and a closure portion. The visually detectable pattern is applied between the primary data organizing system and the closure portion of said at least one session. The at least one session further comprises data, wherein at least part of the data (Data Zone 1) is peripherally arranged with respect to the visually detectable pattern and within said at least one session.

In the embodiment of FIG. 10 the visually detectable pattern is arranged between a first and a second data zone within a session. In this embodiment the logical address space is discontinuous, because a gap without machine interpretable data is present between the primary data organizing system and the first data zone.

Figure 12:
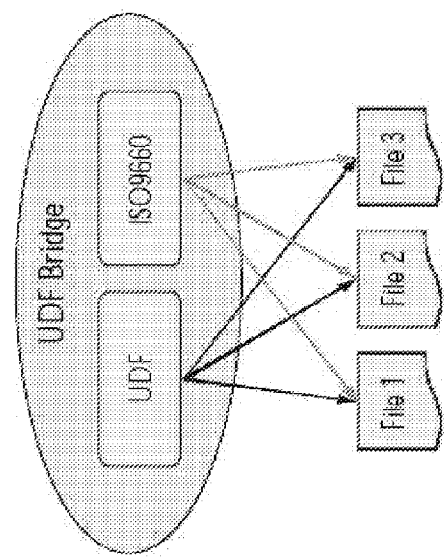
FIG. 12 shows a second aspect of a DVD-video disc.
Figure 11:
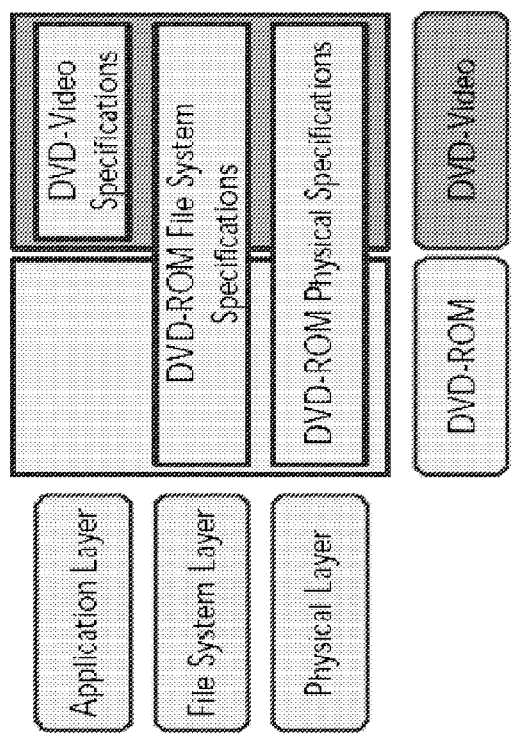
FIG. 11 shows a first aspect of a DVD-video disc.

In a further embodiment the record carrier is a DVD-video disc. In this embodiment the data organizing system is a DVD-Video manager. As illustrated in FIG. 11, the DVD-Video disc comprises a video manager that functions as a primary data organizing system on top of the file system layer (forming a secondary data organizing system) and the physical layer. Accordingly, as shown in FIG. 12, for DVD videodiscs the navigation on the disc is handled at two levels. The navigation on the disc is handled by a first data organizing system, the Video Manager. Furthermore the disc comprises the secondary data organizing systems UDF and ISO9600. The video manager, forming an application layer, is set out in more detail herein below.

The location of files is indicated by the secondary data organizing system. However, the primary data organizing system, the Video Manager, controls the navigation over the disc in the Video Zone. The primary and the secondary data organizing system solve (facilitate) backwards compatibility of a visible image located in the user data area.

Contrary to the previous examples the DVD-Video disc is a single-session record carrier. To prevent a discontinuity in the logical address space, virtual files are created that overlap the area occupied by the visual pattern. These virtual files however, are not be referred to by the DVD-Video manager.

The secondary data organizing system allocates files at the label location but the Video Manager or menu structure does not point to that label file. Also, the Next-cell pointers and Fast Forward pointers in the NAV package do not point to the cells within the image area.

Figure 13:
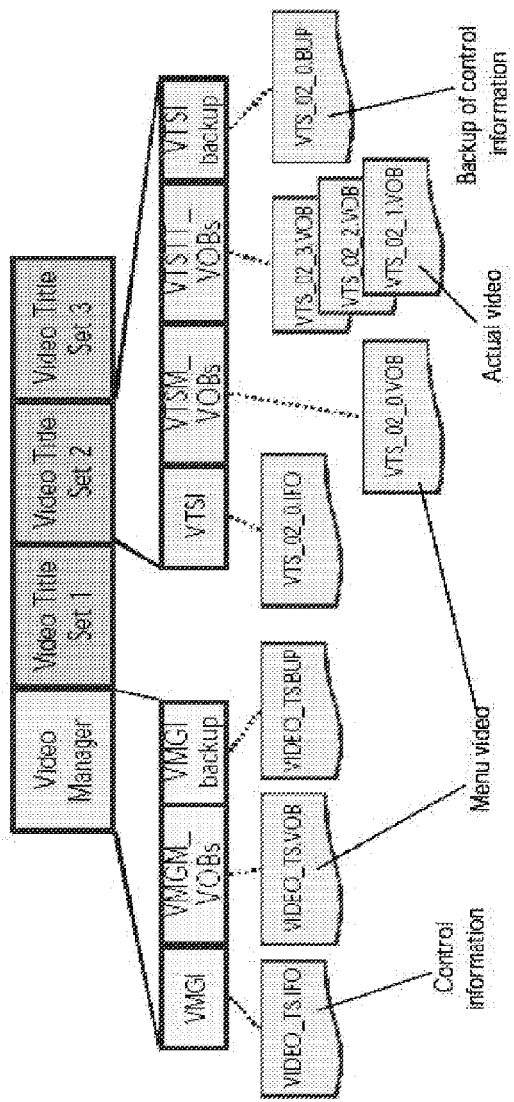
FIG. 13 shows a third aspect of a DVD-video disc, FIG. 14 schematically shows the data content of a tenth embodiment of a record carrier according to the invention.

FIG. 13 shows a general file structure for a DVD-Video disc. A DVD-Video consists of Presentation data, which is the actual video and audio content, and Navigation data. To store this data, a DVD-Video contains, within a root directory, a Video Manager (VMG) and Video Title Sets (VTS). The Video Manager controls the entire Video Zone. Each Video title set contains control and menu information to play the actual video content.

As shown in FIG. 13, each video title set may comprise a plurality of files. These files may be one of the following types.

Files of type .IFO: These files contain application information.

Files of type VOB: These files contain the actual video content in the form of a series of one or more cells.

Files of type BUP: These files contain a backup of application information

Alternatively other files of other types may be included in a video title set

There may be 1-99 Video Title Sets, and each Video Title set may contain 1-9 VTS-VOB files.

On DVD-Video discs, the files are referenced by UDF1.02 and ISO9660 file systems (UDF Bridge). All files are recorded in a single extent (non-fragmented). Physically, the files are recorded in a strict order.

According to one aspect of the illustrative embodiments, a visually detectable pattern is applied to the disc at an area in between two subsequent files in this order. I.e. the visually detectable pattern is applied between an end of a first file and a start of a second file that succeeds this file in this order.

Figure 14:
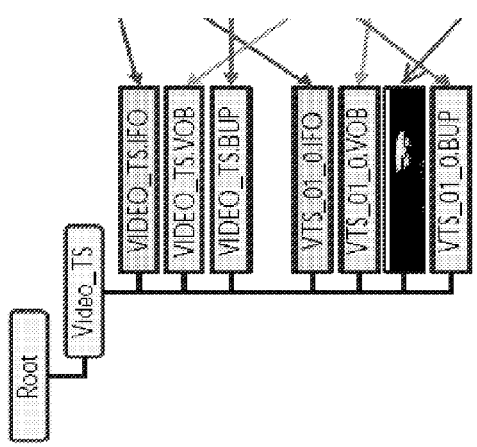

In the embodiment shown in FIG. 14 a video content file, here VTS-01-1.VOB overlaps with the visually detectable pattern. In this example, the data element, here the video content file VTS-01-1.VOB is referred to a file in the secondary data organizing system, the file system UDF. However the primary data organizing system, the video manager, does not refer to this file.

Figure 15:
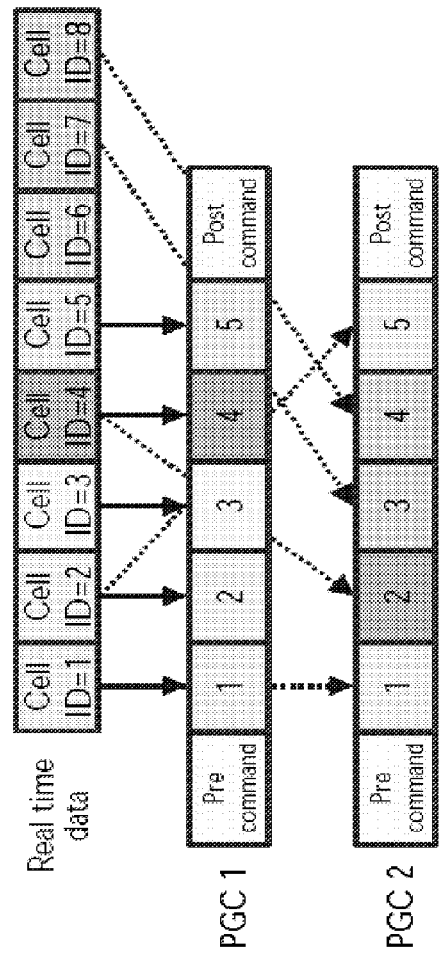
FIG. 15 shows a fourth aspect of a DVD-video disc, FIG. 16 schematically shows the data content of an eleventh embodiment of a record carrier according to the invention, FIG. 17 schematically shows the data content of a twelfth embodiment of a record carrier according to the invention, FIG. 18 schematically shows the data content of a thirteenth embodiment of a record carrier according to the invention, FIG. 19 schematically shows an embodiment of an apparatus according to the invention.
Figure 16:
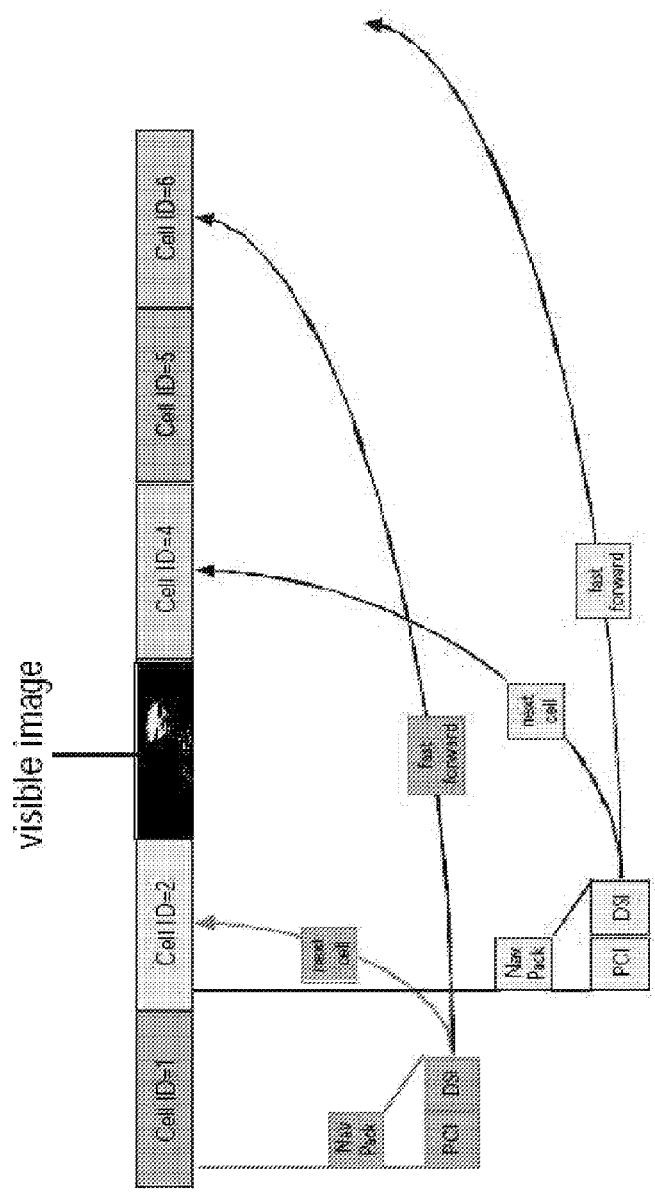

As further illustrated in FIG. 15, the video data is recorded on the disc in cells. A cell is a unit of playback of real-time video data (scene). Each cell has a fixed ID-number, and the length of each cell ranges from less than a second to several minutes. A Program Chain (PGC) defines the order in which the cells are played back. A Title may have one or more linked PGC's. The PGC's and cells may be played in arbitrary order for selection of multi-angle, parental level, or story lines. Each PGC may have a pre- and post-command (executed before/after a PGC is played). And each Cell may have a cell-command (executed each time a cell is played). The structure of the cells is shown in more detail in FIG. 16. As shown in FIG. 16, each cell comprises video, audio and subtitle information, as well as a navigation pack including a presentation control info (PCI) and data search information (DSI). The data search information comprises a pointer to a next cell for a normal reproduction of the video content, and a pointer to a more remote cell to enable a fast reproduction of the video content.

The presence of cell commands and pre/post commands is optional. With these commands, interactivity is achieved. For example a cell can play itself indefinitely by issuing a cell command to start the playback of itself, until the user presses "stop" on the remote control, or a cell command can request the DVD player to skip over a group of cells so that these video segments can never be played back even though they exist on the DVD.

A cell consists of one or more Video Object Units (VOBU). Each VOBU is 0.4 sec to 1 sec playback time and consists of Packs (2048 bytes). In the VOBU Video, Audio, Subtitles and so on are multiplexed. Each VOBU starts with a Navigation Pack that consists of 2 packets:

PCI: Presentation Control Information
DSI: Data Search Information

In a further illustrative embodiment, shown in FIG. 16, a cell of a video content file overlaps the visually detectable pattern, or otherwise stated the visually detectable pattern replaces one or more cells. In the illustrative embodiment, one cell with ID 3 is replaced by a visible image. Both the cell command and the DSI feature are used to evade the label area by the video disc player. In the cells before the visible area a skip command is added over the virtual cells at the location of the visually detectable pattern. Also the next cell pointer and the fast-forward pointer in any DSI do not refer to the location of the visually detectable pattern.

Figure 17:
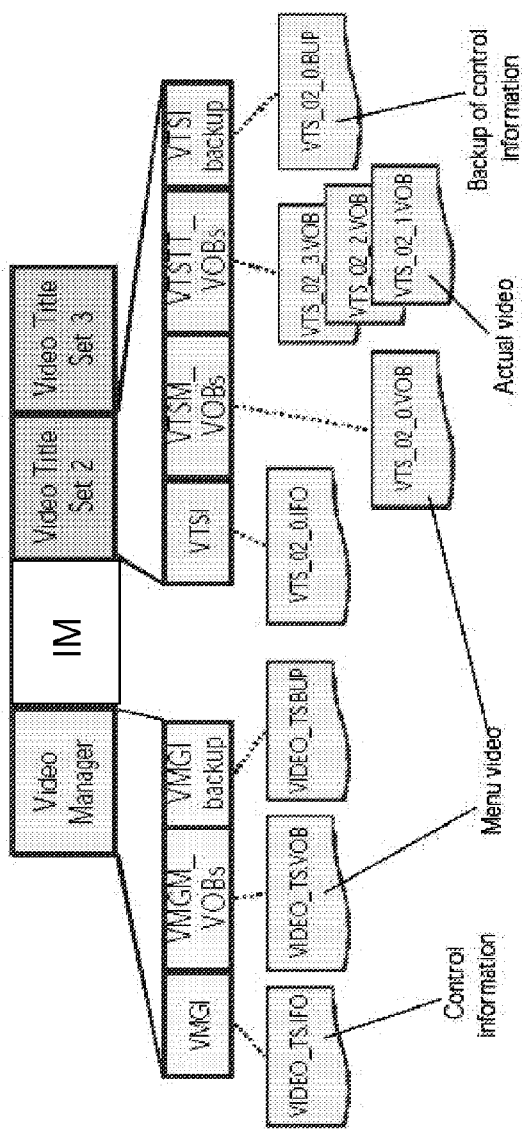

In a still further embodiment, shown in FIG. 17, the visually detectable pattern replaces a video title set. Concluding, the solution to prevent access of the label area on a DVD video disc is possible at several levels:

At secondary data organizing system level, a label file is addressed at the label location. Several solutions are capable for evading the area with the visually detectable pattern such that that area is never physically accessed:

One complete Video Title Set, that includes the visually detectable pattern, is not referenced to by the root-menu.

One or more files within a Video Title Set, that include the visually detectable pattern, are not referenced to by the primary data organizing system.

One or more cells within a Video Title Set, that include the visually detectable pattern, are not referenced to by any Program Chain and are not referenced to by any NAV-packs either. Both the next-cell pointer and the fast forward-cell pointer in the NAV-packs ignore the label area.

This area with the visually detectable pattern or "visible image"-area can contain a start- and end-buffer zone. The buffer zone can contain a conventional video data stream.

The presented solution is especially useful for applying a label on DVD+R and DVD-R discs used to create a videodisc: the solution prevents a normal application and a normal drive from accessing the label area.

These measures are equally applicable for application of a visually detectable pattern at video discs of other types, e.g. BD-video en HD-DVD video.

Figure 18:
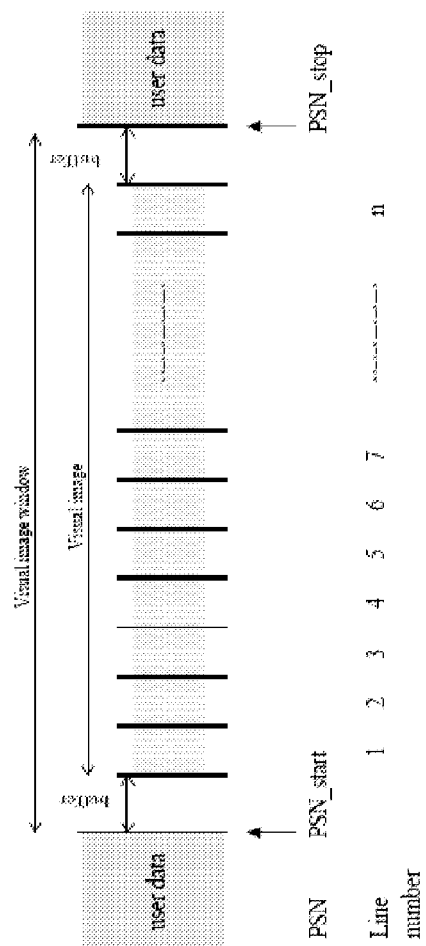

FIG. 18 shows an example of a record carrier according to the invention wherein the visually detectable pattern is arranged in a visual image window that comprises a buffer zone on both sides of the visually detectable pattern.

Figure 19:
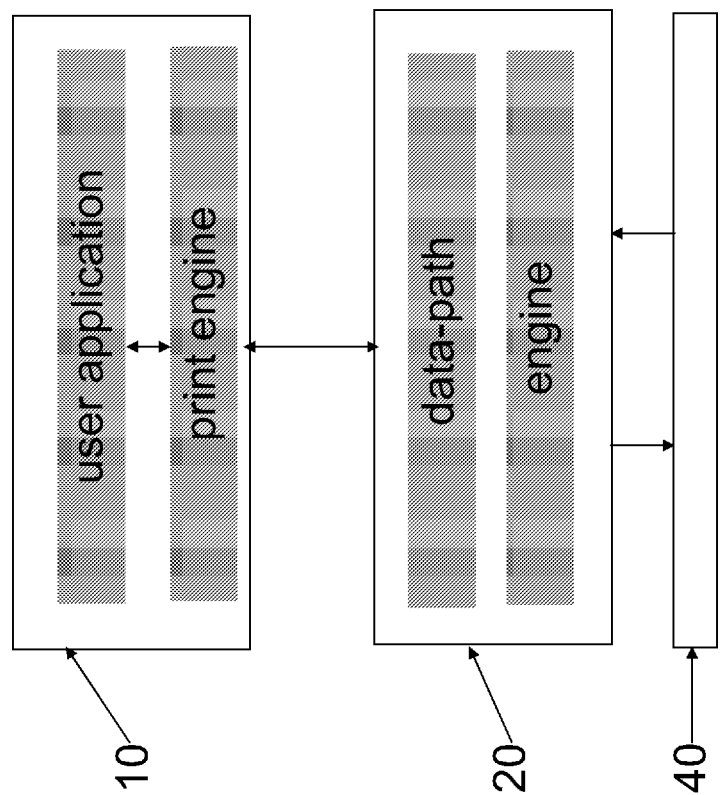

FIG. 19 schematically shows a general overview of an embodiment of an apparatus 10, 20 for recording a disc shaped record carrier 40. The apparatus is arranged for recording a visually detectable pattern at the record carrier 40 in a ring shaped zone. The apparatus is further arranged for recording at least part of the data or the primary data organizing system on the record carrier at an area peripherally arranged with respect to the ring shaped zone. The apparatus is further arranged to record a primary data organizing system wherein the data is organized, wherein the primary data organizing system does not refer to a physical address within the ring shaped zone.

The system comprises a host processor 10 and a drive 20 that communicate with each other with a command set. The host processor 10 carries out a first process (user application) that generates an image to be printed at the record carrier 40 as a visually detectable pattern. The user application, e.g. NERO Xpress may communicate with a command set to a lower level driver 20 that on its turn controls the hardware that executes the recording process.

The image may for example comprise a logo or a text comprising a sequence of characters.

A print engine may transform the image. The transformation is dependent on the shape of the record carrier (e.g. circular or rectangular) and the desired location (at a central portion of the disc or more on the periphery) on the record carrier where the image is to be printed as a visually detectable pattern.

The print engine communicates with the drive 20 in order to have it print the transformed image at the record carrier 40. The drive forms a recording facility.

Figure 20:
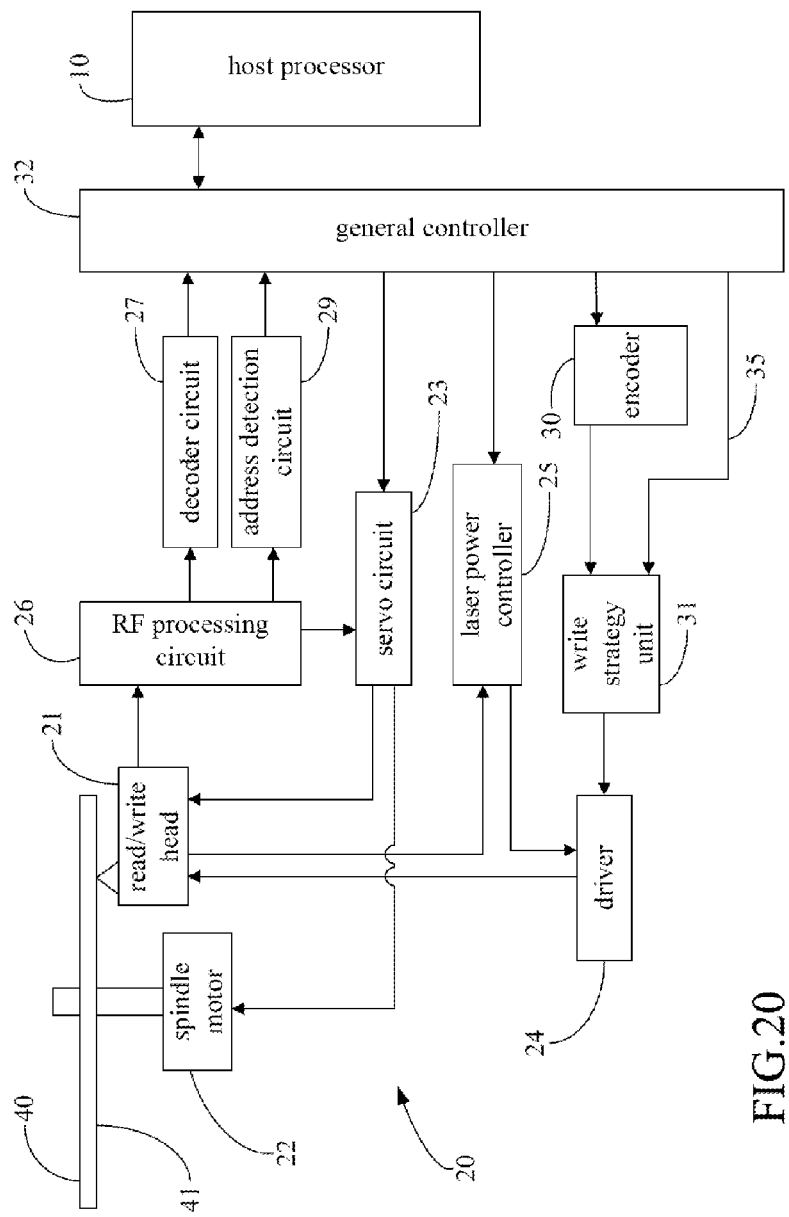
FIG. 20 depicts the embodiment of FIG. 19 in more detail.

FIG. 20 shows an embodiment of the apparatus 10, 30 in more detail. As shown therein the drive 20 comprises a read/write head 21 to read optically detectable information from the record carrier 40 and to provide an output signal representative for the information read from the record carrier to an RF processing circuit 26. The read/write head 21 is movable relative to the record carrier 40 by means comprising a spindle motor 22 for rotating the record carrier 40 and further means, e.g. a slide and a radial actuator (not shown) for radially displacing the read/write head 21 relative to the record carrier 40. The relative movement of the read/write head 21 with respect to the record carrier 40 is controlled by a servo circuit 23. The RF processing circuit 26 decomposes the signal obtained from the read/write head 21 into a first output signal that is provided to a decoder circuit 27, which decodes the first output signal into a digital signal representative for the data stored on the record carrier 40. The RF processing circuit provides a second output signal to an address detection circuit 29 that determines the address at the record carrier that is currently accessed by the read/write head 21. The data obtained by decoder circuit 27 and the address determined by address detection circuit 29 is provided to general controller 32. With this information the controller 32 controls the servo circuit 23.

Data is written on the record carrier 40 by an encoder 30, a write strategy unit 31, a driver 24 and the read/write head 21. The data to be written is encoded by the encoder 30. The encoding may include an error protection encoding (e.g. Reed-Solomon) and a channel encoding (e.g. an EFM coding). The encoded signal is provided to the write strategy unit 31 that calculates a required modulation of a signal to be sent to the read/write head in order to optimally represent the encoded signal. This is dependent on the type of record carrier used, e.g. whether the record carrier comprises an active layer on the basis of a phase change material, a dye etc.

The driver 24 converts the output signal into a signal suitable to drive a write facility of the read/write head. Usually the write facility comprises a laser and a lens system for providing a focused beam on the record carrier 40. The actual power applied to the write facility is further regulated by a laser power controller 25. The laser power controller 25 monitors the intensity of the laser beam in response to the signal provided by the driver 24 and adjusts the driver to compensate for temperature changes and temporal deterioration of the laser in the read/write head.

The components in the drive 20 forming the facility for printing the visible pattern at the record carrier 40 are substantially the same as those forming the recording machine-readable data. As for the machine readable data the visible pattern is generated at the recording layer 41 of the record carrier 40 by modulating an intensity of the laser beam from the read/write head 21 while providing a relative displacement between the read/write head 21 and the record carrier 40. Unlike the procedure for machine-readable data, the signal controlling the intensity of the laser beam need not comply with the channel code for recording machine-readable data. Hence the encoder 30 may be bypassed by bypass 35.

In operation of the apparatus a method is performed comprising the following steps:
- a visually detectable pattern is printed. The visually detectable pattern is arranged in a ring shaped zone
- data is recorded
- a primary data organizing system is recorded for organizing the data,
- Part of the primary data organizing system or part of the data is recorded at an area peripherally arranged with respect to the ring shaped zone.

The method may further comprise the step of receiving information representing the visually detectable pattern to be recorded. A user may specify the details of the desired visually detectable pattern via a user interface. Alternatively the information representing the visual pattern may be generated automatically, e.g. a name of a file present on the disc or a recording date at which the latest data was recorded.

Depending on the desired location of the visually detectable pattern the method may have several embodiments. In order to obtain the embodiment of the record carrier as shown in FIGS. 3, 4, 5 and 6 the method comprises the step of recording a plurality of sessions. Each session comprises at least an introductory portion, the primary data organizing system and a closure portion. In the step of recording the visually detectable pattern, the visually detectable pattern is applied at an area between the closure portion of a first session and the introductory portion of a second session.

In order to obtain a record carrier as shown in FIGS. 7, 8 and 9 the method for recording an optical record carrier comprises recording at least one session with an introductory portion, a primary data organizing system, a visually detectable pattern and a closure portion of a session, the visually detectable pattern being applied between the primary data organizing system and the closure portion of said at least one session and recording a second session peripherally arranged with respect to the at least one session.

In order to obtain a record carrier as shown in FIG. 10 the method comprises the steps of recording at least one session with an introductory portion, the primary data organizing system, the visually detectable pattern and a closure portion, and wherein the visually detectable pattern is applied between the primary data organizing system and the closure portion of said at least one session, wherein the at least one session further comprises data, wherein at least part of the data is peripherally arranged with respect to the visually detectable pattern and within said at least one session.

In order to obtain a record carrier as shown in FIG. 14, 16 or 17 comprises the additional step of recording a secondary data organizing system, wherein the visually detectable pattern is applied at an area that is allocated at the record carrier as at least one file within the secondary data organizing system.

It is known as such how a visually detectable pattern can be applied to an optical record carrier. Examples are described in the cited documents US 2004/0062179 and JP2005135464. The visually detectable pattern may be applied with substantially the same means as the means used to write machine readable data to the record carrier. However since the visually detectable pattern need not be machine readable, the visually detectable pattern does not need to comply with the coding requirements for machine readable data. Accordingly in the apparatus of FIG. 4, the encoder 30 may be bypassed to print the visually detectable pattern at the record carrier.

While the invention has been illustrated and described in detail in the drawings and foregoing description, such illustration and description are to be considered illustrative and exemplary and not restrictive; and the invention is not limited to the disclosed embodiments.

Other variations to the disclosed embodiments can be understood and effected by those skilled in the art in practicing the claimed invention, from a study of the drawings, the disclosure and the appended claims. For example, although in particular a disc shaped record carrier is described, other shapes are possible, e.g. record carriers in the shape of a credit card. In that example, the visually detectable pattern may for example indicate the amount of credit currently available to the user. In the claims the word "comprising" does not exclude other elements or steps, and the indefinite article "a" or "an" does not exclude a plurality. A single processor or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. An apparatus for recording an optical record carrier, the apparatus comprising:
   - a recording facility for recording a data and a primary data organizing system in a recording layer of the optical record carrier, and for printing a visually detectable image in a label area of the recording layer of the record carrier, wherein the optical record carrier contains the data and the visually detectable image in the same recording layer; and
   - an encoder for encoding the data, wherein the data is encoded by the encoder, and the visually detectable image bypasses the encoder;
   - wherein the primary data organizing system refers to a physical address of the data but not refer to a physical address within the label area that accessing the labeled area is prevented,
   - wherein the recording facility is capable of recording at least part of the data or the primary data organizing system on the record carrier at an area peripherally arranged with respect to the label area;
   - wherein the recording facility is capable of recording at an optical record carrier at least one session comprising an introductory portion, a primary data organizing system, a visually detectable image and a closure portion, and wherein the visually detectable image is applied between the primary data organizing system and the closure portion of said at least one session, and wherein the recording facility is further capable of recording at least a second session that is peripherally arranged with respect to the at least one session.

2. The apparatus according to claim 1, wherein the recording facility is capable of recording at an optical record carrier a plurality of sessions, each session comprising at least an introductory portion, a primary data organizing system and a closure portion, and wherein the recording facility is capable of applying the visually detectable image at an area between the closure portion of a first session and the introductory portion of a second session.

3. The apparatus according to claim 1, wherein the recording facility is capable of recording at an optical record carrier at least one session with an introductory portion, the primary data organizing system, and a closure portion, and wherein the recording facility is arranged for applying the visually detectable image between the primary data organizing system and the closure portion of said at least one session, wherein the at least one session further comprises data, wherein at least part of the data is peripherally arranged with respect to the visually detectable image and within said at least one session.

4. The apparatus according to claim 1, wherein the recording facility is arranged for recording at an optical record carrier a secondary data organizing system, wherein the visually detectable image is applied at an area that is allocated at the record carrier as at least one element within the secondary data organizing system.

5. The apparatus according claim 4, wherein the primary data organizing system is a video manager system and the secondary data organizing system is a file system.

6. The apparatus according to claim 5, wherein the secondary data organizing system is a UDF file system.

7. The apparatus according to claim 5, wherein the secondary data organizing system is an ISO9660 file system.

8. The apparatus according to claim 4, wherein the data organizing system is a video file structure with a root directory, and within the root directory a Video Manager (VMG) and one or more Video Title Sets (VTS), wherein each video title set may comprise a plurality of files, including at least one of the following types, information files, video content files, backup files, wherein the video files comprise video content in the form of a series of one or more cells.

9. The apparatus according to claim 8, wherein a video title set overlaps the visually detectable image.

10. The apparatus according to claim 8, wherein a video content file overlaps the visually detectable image.

11. The apparatus according to claim 8, wherein a cell of a video content file overlaps the visually detectable image.

* * * * *